United States Patent [19]

Ito et al.

[11] Patent Number: 4,783,297

[45] Date of Patent: Nov. 8, 1988

[54] METHOD OF PRODUCING CERAMIC PARTS

[75] Inventors: Shigenori Ito, Kasugai; Takeyuki Mizuno, Toyohashi, both of Japan

[73] Assignee: NGK Insulators, Ltd., Nagoya, Japan

[21] Appl. No.: 873,487

[22] Filed: Jun. 12, 1986

Related U.S. Application Data

[63] Continuation of Ser. No. 608,248, May 8, 1984, abandoned.

[30] Foreign Application Priority Data

May 13, 1983 [JP] Japan .................................. 58-82513

[51] Int. Cl.⁴ .............................................. C04B 35/64
[52] U.S. Cl. ........................................ 264/63; 264/67; 416/241 B
[58] Field of Search ................ 264/63, 67; 416/241 B

[56] References Cited

U.S. PATENT DOCUMENTS 4,460,527  7/1984  Kato ..................................... 264/63
4,579,703  4/1986  Adlerbom et al. .................... 264/63

FOREIGN PATENT DOCUMENTS 2910932  9/1980  Fed. Rep. of Germany ... 416/241 B

OTHER PUBLICATIONS

Teter, Binders for Machinable Ceramics, in Ceramic Age 82 [8], 1966, pp. 30-32.
Stoddart D. E., Using Silicon Nitride for Gas Turbine Engines, In Gas Turbine International, Jul.-Aug. 1972, pp. 16-19.

Primary Examiner—James Derrington
Attorney, Agent, or Firm—Parkhurst, Oliff & Berridge

[57] ABSTRACT

Ceramic parts of complicated configurations with different thicknesses at different portions can be mass produced economically with high production yield and excellent quality using an injection molding process.

7 Claims, 2 Drawing Sheets

METHOD OF PRODUCING CERAMIC PARTS

This is a continuation of application Ser. No. 608,248, filed May 8, 1984, now abandoned.

BACKGROUND OF THE INVENTION

1. Field of the Invention

The present invention relates to a method of producing ceramic parts, particularly to a suitable method of economically producing ceramic parts of complicated configurations which hitherto can not be produced directly to their final configurations using injection molding process.

2. Description of the Prior Art

Recently, ceramic parts made of a material with superior high temperature characteristics, such as $Si_3N_4$, SiC or the like, having increasing application fields in high temperature structural materials by virtue of their superior high temperature strength, heat resistance, thermal shock properties and corrosion resistant properties, and have shown remarkable technical progress.

Ceramic parts of complicated configurations with thin blade portions and comparatively thick axis portion, such as turbo charger rotors for Diesel engines, radial type turbine rotors for gas turbine engines, and the like, are required to have strict dimensional precision as well as superior mechanical and thermal characteristics.

Heretofore, for producing such ceramic parts as the abovementioned rotors of complicated configurations consisting of two portions of different thicknesses, there have been attempted such methods as slip casting and injection molding, etc. using superior heat-resistant $Si_3N_4$ SiC powder. However, the slip casting method has a drawback in that it could not produce distal ends of blades portion of such rotors with sufficient precision of shape and dimension, which distal ends have a great influence on efficiency of the rotors. The heretofore used injection molding method has a drawback in that it could not produce directly an integrally molded part of final shape having a thin blade portions of a complicated configuration and a thick columnar axis portion, since a die for filling the molding material sufficiently into its cavity is hardly fabricated. Therefore, in conventional injection molding methods, the ceramic part is produced at first by molding a green body using a material powder and a resin as a molding additive, removing (degreasing) the resin from the molded green body, and machining the degreased body before or after the final firing. However, this method has drawbacks in that the degreased molded body is liable to have a crack therein or deformation thereof owing to different degreasing rates at different thickness portions of the body in the degreasing process so that the yield of product is considerably low, and that the chips produced by machining the degreased body can never be reused owing to the disappearance of the molding additive so that the production cost is extremely expensive.

SUMMARY OF THE INVENTION

Therefore, an object of the present invention is to obviate the aforementioned drawbacks of the prior art.

Another object of the present invention is to provide a novel suitable method of producing ceramic parts of complicated configurations with different thicknesses in different portions using an injection molding process.

The method of the present invention comprises at least the following processes of:

(1) adding and mixing an additive for injection molding (to be referred to as "molding additive" hereinafter) to a material powder selected from the group consisting of ceramic powder, metal powder and a mixture thereof.

(2) injection molding the mixture to a desired shape of a complicated configuration, (3) processing the molded green body to a substantially final configuration, (4) removing (degreasing) the molding additive, and (5) firing the degreased body to sinter the same.

After the firing, the sintered body is optionally finished by machining, if necessary.

As the ceramic powder use is made of powder of metal such as $Si_3N_4$, SiC or the like ceramic metal or the mixture thereof. If $Si_3N_4$ powder is used for improving the density and strength of the final product, preferably 1-20 parts by weight, relative to the $Si_3N_4$ powder, of a powder of MgO, $Al_2O_3$, $Y_2O_3$, $ZrO_2$, $CeO_2$, SrO or a mixture thereof etc. is added as an additive for sintering (to be referred as "sintering additive" hereinafter) to the $Si_3N_4$ powder. If SiC powder is used, preferably (i) each 0.1-5 parts by weight, relative to the SiC powder, of B or $B_4C$ and C or carbonizable organic substance in powdery states are added to the SiC powder, or (ii) 0.1-10 parts by weight, relative to the SiC powder, of $Al_2O_3$ powder is added to the SiC powder.

As the metal powder, use is made of powder of metal or metals selected from the group consisting of Si, Al and the like metal that can be converted to a ceramic substance such as $Si_3N_4$, AlN or the like by reacting with a nitriding environmental gas such as $N_2$ in the firing process.

As the molding additive, use is made of a thermoplastic resin or resins selected from the group consisting of polystyrene, polypropyrene, polyethylene, ethylene-vinyl acetate copolymer and a mixture thereof, wax, or a lubricant such as stearic acid, oleic acid or a mixture thereof.

In a preferred embodiment of the present invention, the injection molding is performed as follows. A material powder selected from the group consisting of the ceramic powder and the metal powder is added with the molding additive and mixed completely, and then the mixture is pelletized to pellets of an average diameter of about 1-5 mm by a pelletizer etc., and thereafter injection molded to a green molded body of a desired shape of complicated configurations having different thicknesses portions.

In a preferred embodiment of the present invention, the degreasing process is conducted by a moderate heating of the green body at a temperature of about 300°-550° C., preferably about 350°-500° C., for about 3-8 hrs.

BRIEF DESCRIPTION OF THE DRAWINGS

For a better understanding of the present invention, reference is made to the accompanying drawings, in which.

Figure 1:
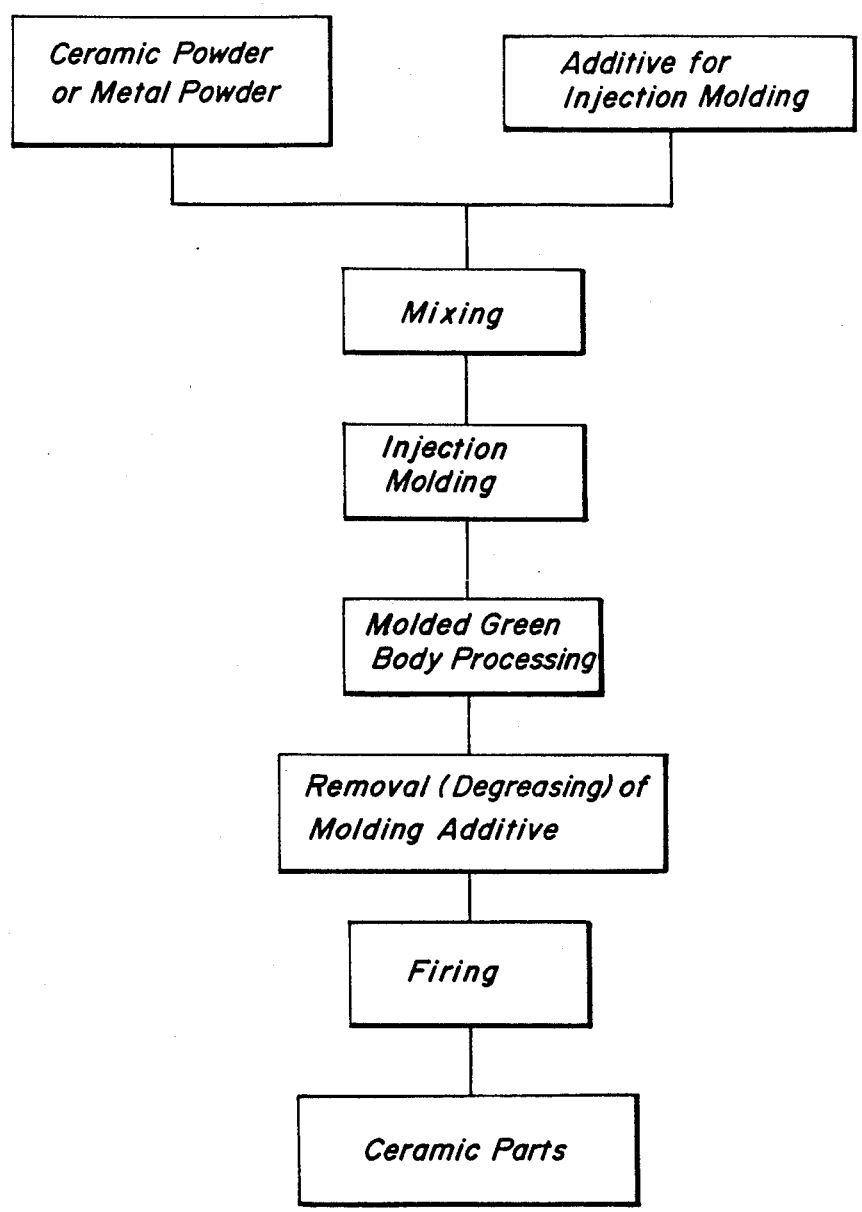
FIG. 1 is a block diagram of the processes according to the present invention.

Throughout different views of the drawings, reference numeral 21 is a rotor for a turbo charger, 22 is a blades portion, 23 is an axis portion before the processing, 24 is an axis portion after the processing, and 25 is a groove for sealing.

DETAILED EXPLANATION OF THE INVENTION

The processes of the method of the present invention is schematically shown in block diagram as shown in FIG. 1.

Conditions for the injection molding are properly selected depending on the types and amounts of the material powder and the molding additive. For Example, if 100 parts by weight of material $Si_3N_4$ powder and a molding additive consisting of 15 parts by weight of polystyrene, 3 parts by weight of polyethylene and 2 parts by weight of stearic acid are used for the injection molding, an injection pressure of about 500–1,500 $kg/cm^2$, and a molding temperature of about 150°–250° C. are preferably used.

Injection molded green bodies of complicated configurations are subsequently processed to a substantially final shape. The term "molded green body" or "green body" used herein means an injection molded material not yet treated by a treatment such as degreasing, firing, processing or machining, except for a drying treatment.

Processing of the green body is usually effected by a ceramic bit such as WC, $Si_3N_4$ etc. It can be effected also by using a diamond or boron nitride grindingstone.

The green body processed to a substantially final shape is degreased or removed from the molding additive. The removing process varies depending on the types and amounts of the molding used additives. If polystyrene, polyethylene and stearic acid were used in combination as the molding additive, the molding additive can be removed by raising the temperature from a room temperature to about 400° C. at a temperature raising rate of about 4° C./hr, and holding the temperature of about 400° C. for about 3–5 hrs.

If non-oxidized material e.g. a ceramic powder such as $Si_3N_4$, SiC or the like or a powder of metal such as Si, Al or the like was used as a material powder, environmental atmospheres in the degreasing process and the final firing process are preferably a non-oxidizing atmosphere such as $N_2$, Ar or the like for preventing oxidation of the non-oxidized material.

According to the method of the present invention, the molded green body of complicated configuration is processed to a substantially final configuration before it is subjected to the degreasing process, so that even when a structural part of a complicated configuration is to be produced, the machining process which is sometimes used for finishing the sintered body, can be dispensed with or substantially decreased and the raw materials are effectively used far better than conventional methods. In other words, the green body processed to a substantially final configuration before degreasing thereof has almost the same shape and dimension as those of the final product after firing. Thus, final machining of the sintered body after the firing is completely or substantially unnecessary, i.e., only a little bit of machining is sufficient if such is necessitated. In addition, the chips of the raw materials containing the molding additive resulting from the processing of the green body can be reused for the injection molding by mixing it with a fresh raw materials because it still pertains the molding additive, so that the necessary amount of the raw materials for producing a certain yield of product can be remarkably reduced as compared with conventional methods. Thus, material efficiency is remarkably improved.

Besides, the time required for the green body-processing process is far shorter than that required for machining or griding the sintered body by a diamond gridingstone in the conventional methods, and it can be effected with the use of a ceramic bit which is cheap as a grindingstone, so that it is economically more advantageous in labor time and costs.

When dimensional precision of the ceramic parts is strictly required, a finishing machining is necessary for the product after the final firing process. However, even in such a case, only a slight finishing machining of the product is sufficient to meet the requirement, because the final configuration of the product has substantially been attained already by the processing of the green body, so that the finishing machining can be effected much shorter and cheaper than conventional methods.

DESCRIPTION OF THE PREFERRED EMBODIMENTS

Hereinafter, the present invention will be explained in more detail with reference to preferred embodiments, which however should not be construed by any means as limitations of the present invention. In the following Examples, all parts are shown by weight basis, unless otherwise specified.

EXAMPLE 1

Figure 2A:
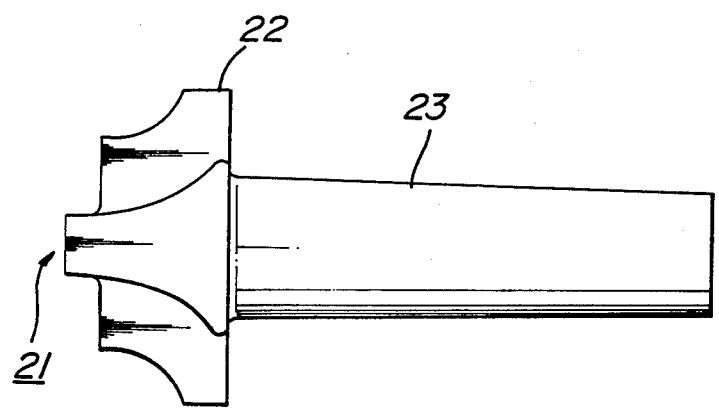
FIG. 2A is a schematic longitudinal side view of a molded green body of ceramic part produced by the method of the present invention.
Figure 2B:
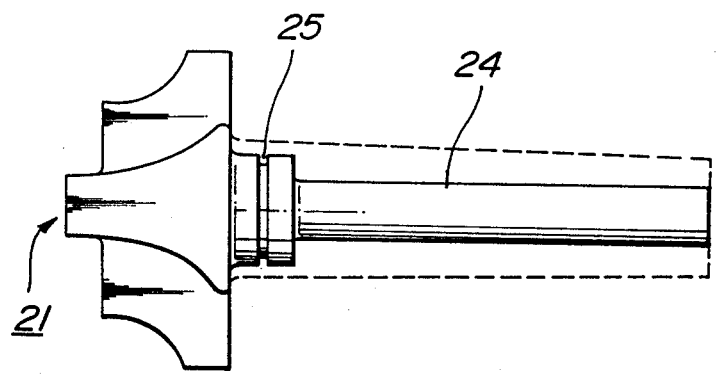
FIG. 2B is a schematic longitudinal side view of a processed body produced by the method of the present invention.

100 parts of $Si_3N_4$ powder is added with a sintering additive consisting of 4 parts of MgO, 1 part of SrO and 5 parts of $CeO_2$, and further added with a molding additive consisting of 15 parts of polystyrene, 3 parts of polyethylene, 2 parts of stearic acid and 2 parts of ethylene-vinyl acetate copolymer, and mixed. The mixture is kneaded sufficiently by a pressure type kneader, and then granulated to pellets of diameters of about 2–3 mm by a pelletizer. The pellets are heated to 200° C. and fed in a die of an injection pressure of 1 $t/cm^2$ and a temperature of 50° C. to mold five rotors for turbo chargers, as shown in FIG. 2A. Each rotor has a blades portion 22 of a diameter of 60 mm, and an axis portion 23 of a diameter of 25 mm. The blades portion 22 has a thickness of 0.7 mm at its thinnest point. Two of the five rotors are immediately processed or ground at the axis portion 23 by means of a ceramic bit such that the axis portion 24 formed by grinding has a diameterof 12 mm, and the axis portion 24 is further processed to form a sealing groove 25, as shown in FIG. 2B.

The two processed bodies and the remaining three unprocessed green bodies are put in a hot air circulation type electric furnace, and heated therein in such a manner that the temperature of the furnace is raised from room temperature to 400° C. at a temperature raising rate of 4° C./hr, and held at 400° C. for 5 hrs. to remove the molding additive.

The two processed and degreased bodies according to the present invention are found to have no cracks or deformation at both the blade portions and the axis portion. While, one of the three unprocessed and degreased bodies was found to have a crack at the boundary between the blades portion and the axis portions.

The two processed and degreased bodies according to the present invention and the two unprocessed and uncracked degreased bodies are fired in $N_2$ atmosphere at 1,700° C. for 30 min. to sinter the same, and thereafter machined at their axis portions to a final configuration with the aid of a diamond grindingstone. The time required for the machining is only 10 min. for each of the processed, degreased and sintered body, whereas the time is 1 hr for each of the unprocessed, degreased and sintered body.

EXAMPLE 2

100 parts of SiC powder is added with a sintering additive consisting of 2 parts of $B_4C$ and 2 parts of carbon black and a molding additive consisting of 15 parts of polystyrene, 5 parts of paraffin wax and 2 parts of oleic acid, and mixed, kneaded and pelletized as in Example 1. The pellets are heated to 150° C., and fed in a die of an injection pressure of 500 kg/cm² and a die temperature of 50° C. to injection mold three radial type turbine rotors for gas turbines. The rotors have a blades portion of which the minimum thickness is 0.8 mm, and an axis portion of a diameter of 30 mm.

One of the three molded green bodies is processed to a substantially final configuration by using a ceramic bit, taking the dimensional change due to shrinkage by firing into consideration. The processed body and the other two unprocessed green bodies were heated in Ar atmosphere in a hot air circulation type electric furnace from room temperature to 500° C. at a temperature raising rate of 5° C./hr, and held at 500° C. for 3 hrs, to remove or degrease the molding additive.

The processed body was found to have no cracks or deformation at both the blade portions and the axis portion after removal of the molding additive. While, one of the two unprocessed bodies was found to have a minor crack at the boundary between the blade portions and the axis portion after removal of the molding additive.

The non-cracked and non-deformed processed body according to the invention and the non-cracked unprocessed body both after the degreasing were fired and sintered in an Ar atmosphere at 2,200° C. for 1 hr, and thereafter machined at their axis portions to a final configuration by the use of a diamond gridingstone. The time required for the machining was only 15 min. for the processed, degreased and sintered body, whereas the time was 1.5 hrs for the unprocessed, degreased and sintered body.

Grinding chips produced by processing the molded green body are recovered, mixed with a fresh raw materials and tested whether they can be again utilized as raw materials for the turbine rotors or not. As a result, it is found that they are sufficiently usable as raw materials for the ceramic part without any problems.

EXAMPLE 3

100 parts of Si powder is added with 1.5 parts of $Fe_2O_3$ as a nitriding additive (sintering additive) and further with a molding additive consisting of 4 parts of polyethylene and each 5 parts of three waxes, each wax respectively having a melting point of 76° C., 90° C. and 137° C., and mixed, kneaded and pelletized as in Example 1. The pellets are injection molded to a rotor for a turbo charger, as shown in FIG. 2A. The molded green body is processed to a final configuration using a ceramic bit, and the processed body is heated in $N_2$ atmosphere from room temperature to 350° C. at a temperature raising rate of 3° C./hr and held at 350° C. for 8 hrs. to remove the molding additive completely. Then, the degreased body is fired in $N_2$ atmosphere at 1,400° C. for 10 hrs. so as to become sintered and nitrided. Thus obtained sintered turbo charger rotor made of silicon nitride was found to have no crack or deformation, and has an appreciably good dimensional precision, and only needs a surface finishing at the axis portion.

As clearly apparent from the foregoing detailed explanation, the method according to the present invention produces, in an economical way, non-cracked or non-deformed ceramic parts of complicated configurations with different thicknesses at different portions that could not be produced directly to final configurations by conventional injection molding methods, so that it is eminently useful industrially.

Although the present invention has been explained with reference to specific values and embodiments, it will of course be apparent to those skilled in the art that the present invention is not limited thereto and many variations and modifications are possible without departing from the broad aspect and scope of the present invention as defined in the appended claims.

What is claimed is:

1. A method of producing ceramic parts, comprising, adding a molding additive selected from the group consisting of a thermoplastic resin, wax and a lubricant to a ceramic powder to form a mixture thereof, injection molding the mixture so as to form an injection molded body of a desired shape having at least one thick portion and containing the molding additive, finishing machining the injection molded body to reduce at least said at least one thick portion in size to a substantially final configuration, removing the molding additive from the machined body by heating at a temperature not exceeding 500° C. without reacting the ceramic powder to yield a machined and degreased body, and firing the machined and degreased body to sinter the same, whereby a ceramic part having a complicated configuration with different thicknesses in different portions can be produced and whereby the formation of cracks in the ceramic part is prevented.

2. A method as defined in claim 1, wherein the thermoplastic resin is selected from the group consisting of polystyrene, polypropyrene, polyethylene, ethylene-vinyl acetate copolymer and a mixtures thereof.

3. A method as defined in claim 1, wherein the mixture further contains a sintering additive selected from the group consisting of MgO, $Al_2O_3$, $Y_2O_3$, $ZrO_2$, $CeO_2$, SrO and mixtures thereof.

4. A method as defined in claim 1, wherein the ceramic part is a rotor for a turbo charger.

5. A method as defined in claim 1, wherein the ceramic part is a rotor for a gas turbine.

6. A method of producing ceramic parts, comprising, adding a molding additive selected from the group consisting of a thermoplastic resin, wax and a lubricant to a material powder selected from the group of ceramic powders consisting of silicon nitride and silicon carbide to form a mixture thereof, injection molding the mixture so as to form an injection molded body of a desired shape having at least one thick portion and containing the molding additive, finishing machining the injection molded body to reduce at least said at least one thick portion in size to a substantially final configuration, removing the molding additive from the machined body by heating at a temperature not exceeding 500° C. without reacting the ceramic powder to yield a machined and degreased body, and firing the machined and degreased body to sinter the same, whereby a ceramic part having a complicated configuration with different thicknesses in different portions can be produced and whereby the formation of cracks in the ceramic part is prevented.

7. A method as defined in claim 1, wherein said molding additive is present in an amount which is not less than 16 wt %.

* * * * *